United States Patent Office 3,509,116
Patented Apr. 28, 1970

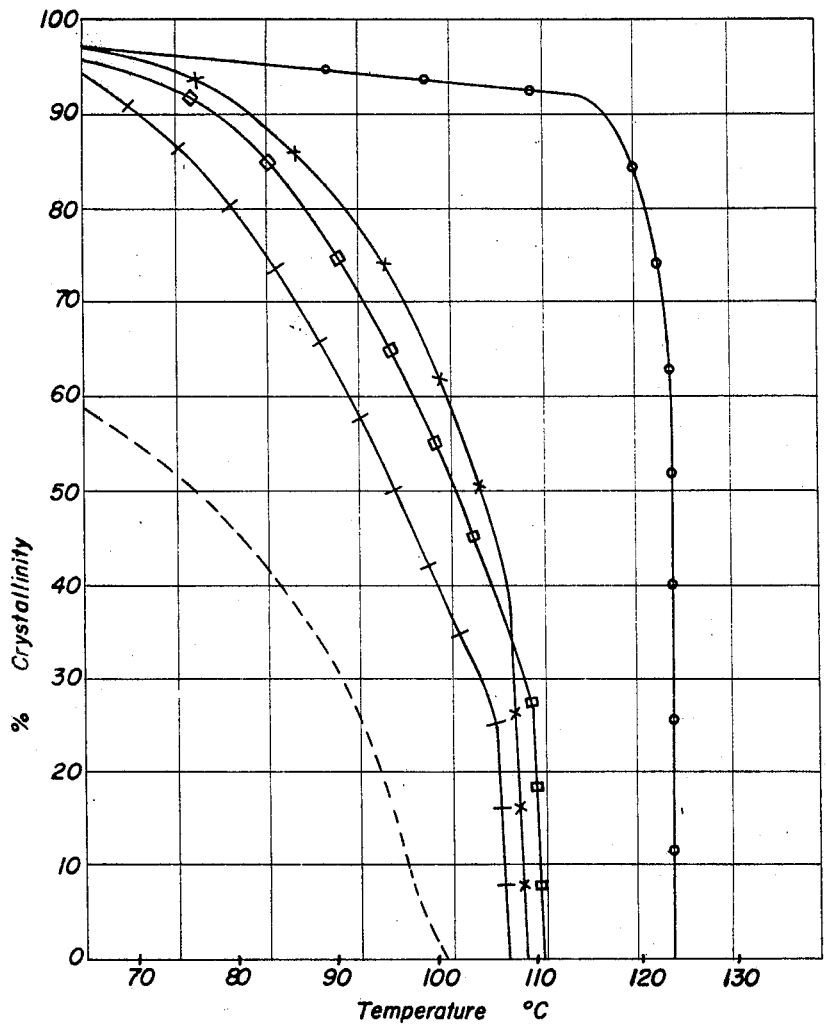

3,509,116
ETHYLENE-BUTENE COPOLYMER
James A. Cote, Kensington, and Razmic S. Gregorian, Silver Spring, Md., assignors to W. R. Grace & Co., New York, N.Y., a corporation of Connecticut
Filed Apr. 13, 1966, Ser. No. 542,238
Int. Cl. C08f 15/04
U.S. Cl. 260—88.2                                       1 Claim

ABSTRACT OF THE DISCLOSURE

A composition capable of being biaxially oriented over a temperature range 98–125° C. without prior crosslinking consisting essentially of an ethylene-butene-1 copolymer having a density in the range 0.920–0.945 and containing 2–10 percent by weight butene-1 said copolymer being polymerized in the presence of a catalyst consisting essentially of an aluminum trialkyl and a mixture of ammonium silicofluoride and chromium oxide on a silica-alumina support said copolymer having the characteristic that at its crystallization temperature it crystallizes uniformly at a rate of increase in crystallinity with decreasing temperature of greater than 10%/° C. in the range 20–40% crystallinity and a rate of increase in crystallinity with decreasing temperature of less than 10%/° C. thereafter.

---

This invention is directed to copolymers and blends of alpha olefins that exhibit unique properties. More particularly this invention is directed to alpha olefin copolymers and blends which can be biaxially oriented over a commercially operable range of temperature conditions without prior treatment.

Ethylene homopolymers and copolymers containing ethylene have received wide commercial acceptance. One end use for such products which has had a spectacular growth rate is that of film. The preferred films today are those that are heat shrinkable which allows one to tightly seal a product, e.g. food or article of manufacture, in a film casing by application of moderate heat to the film wrapping.

In order to obtain a heat shrinkable plastic film it is necessary to first orient the film, usually biaxially, to impart uniform shrinkage in all directions.

Biaxially orientation of plastic film is accomplished mainly by two methods, i.e. blown tube and tenterframe. In the blown tube method, the size of the finished tube is determined by trapping a fixed volume of gas, e.g. air, in the tube between two sets of pinch rollers beyond the extruder die. In addition, the take up roll speed is set high enough to stretch the film in the machine direction. The tenterframe technique requires the use of movable clamps on each side of the film which after gripping the side edges of the film move forward in diverging directions to stretch the film transverse the machine direction while the speed of the take up roll imparts stretch in the longitudinal machine direction. Calendering, which is the use of pressure rollers to stretch the film transversely and increased take up speeds to impart machine direction stretch, can also be used to biaxially orient plastic film. Calendering however has the drawback that, as compared to the other two aforestated methods, the cost is high and the output is low and so is used only in rare cases where the other methods are inoperable. Thus, herein when the term "biaxial orientation" is used, it means biaxial orientation performed by either the blown tube or tenterframe technique. All three aforestated methods of biaxial orientation require maintaining the film at temperatures within about 10° C. below to 20° C. above the crystalline melting point of the plastic film for optimum heat shrinkability.

Orientation of film realigns the molecular configuration to enhance almost every one of the attractive characteristics of the original film and provides new and useful properties as well. The orientation process can be modified to stretch or orient the film in one or more directions in various degrees to provide varying or balanced properties.

Properties improved by orientation are mainly appearance, tensile strength, stiffness, barrier properties, grease and oil resistance to abrasion, slip, utility of thinner gages, low temperature impact strength, and shrinkability.

If the film is oriented in one direction (uniaxially), regardless of which direction it is, the changes listed are found in essentially that direction only. Similarly, if the film is oriented in two directions (biaxially), those same changes are found to exist in both directions of orientation.

One of the features of a biaxially oriented film is that it will shrink in each direction when heated. This shrink, due to plastic "memory," is an attempt to revert to the original unoriented state. Shrink packaging is not only attractive because of its appearance, but it has many practical advantages. The main advantages are: (1) an attractive taut, contoured fit to prevent abrasion and breakage sometimes found in skin and blister packaging; (2) use as a window with the protection of an overwrap; (3) adaptable to bundling or piggyback packaging; (4) that only inexpensive packaging equipment is required and, (5) that the packaging film is low cost.

It is well known in the art that low density conventional branched polyethylene can not be biaxially oriented with good shrink tension without first crosslinking the polymer. If the polymer is not crosslinked prior to orientation, the orientation must be carried out in the melt which results in poor shrink tension due to the necessity of using low air pressure in the blown tube method and slight stretching tension in the tenterframe technique. Thus, to obtain biaxially oriented film with good shrink tension from low density polyethylene it is necessary to perform a crosslinking step prior to orientation.

High density linear polyethylene can be biaxially oriented without crosslinking prior to orientation. However, the orientation temperature is extremely narrow, i.e. 1 to 2° C. and thus is commercially unacceptable in the art. The orientation temperature can be broadened to a commercially operable range, i.e. 5 to 15° C., if the polymer is crosslinked prior to orientation. However, in any case as compared to biaxially oriented low density polyethylene film, the high density film evidences poor clarity.

The same drawbacks that are true for low density polyethylene are also true for all known ethylene-butene-1 copolymers. That is, they must be crosslinked for biaxial orientation below the melting point or be stretched in the melt which latter method imparts insufficient shrink tension to yield commercially acceptable shrinkability on reheating. Thus, to date to obtain biaxially oriented film from ethylene homopolymers and ethylene containing copolymers it is necessary to crosslink the film either by radiation or chemical means prior to the orientation step.

One object of the instant invention is to prepare alpha olefin copolymers and blends capable of being biaxially oriented over a wide range of orientation conditions. Another object of the present invention is to biaxially orient alpha olefin copolymers and blends without first crosslinking same. Other objects will become apparent from reading hereinafter.

Surprisingly, it has now been found that alpha olefin copolymers and blends can be biaxially oriented by the blown tube or tenterframe techniques at temperatures ranging from 98–125° C. without prior crosslinking by copolymerizing or blending said alpha olefin in such proportions that at their crystallization temperature they crystallize uniformly at a rate of increase in crystallinity with decreasing temperature of greater than 10%/°C. in the range 20 and 40% crystallinity and at a rate of increase in crystallinity with decreasing temperature of less than 10%/° C. thereafter.

One copolymer capable of exhibiting these characteristics is ethylene-butene-1 copolymer containing 2.0 to 10% butene-1 by weight. One method of obtaining said ethylene-butene-1 copolymer is by the process of polymerizing a mixture of ethylene-butene-1 in an inert solvent, e.g. cyclohexane, at a temperature in the range 100–425° F. preferably 250–350° F. and a pressure in the range 100–500 p.s.i., preferably 225–450 p.s.i., in the presence of a catalyst consisting essentially of a mixture of ammonium silicofluoride, $(NH_4)_2SiF_6$ and chromium oxide supported on silica-alumina, said mixture being activated by fluidizing in air at a temperature of 1000–1400° F. for a time sufficient to activate said catalyst mixture and an aluminum trialkyl wherein the alkyl groups contain 1 to 8 carbon atoms, to obtain an ethylene-butene-1 copolymer containing 2.0–10 weight percent butene-1 and having a density in the range 0.92–0.945, forming said copolymer into film and biaxially orienting said film at a temperature in the range 97–117° C. The resultant biaxially oriented film has high shrink tension, a high percent shrink, excellent clarity, low vapor transmission, and excellent tear and impact resistance. In addition, the orientation temperature range of these copolymers is sufficiently broad, i.e. 5–16° C., as to afford a commercially operable method of orientation without the need of a prior crosslinking step.

The operable mole ratio range of the ammonium silicofluoride:Cr in the chromium oxide:Al in the aluminum trialkyl in the instant invention is in the range 0.3 to 0.75:1.0:0.1 to 15.0. The catalyst support contains 85–95 weight percent silica and 15–5 weight percent alumina.

In order to obtain a biaxially orientable film from the ethylene-butene-1 copolymer of the instant invention without prior crosslinking, it is critical that (1) the copolymer be formed from the catalyst system taught herein and (2) that the copolymer contain 2.0 to 10 percent by weight butene-1. The absence of either one of these critical factors renders a film which is not biaxially orientable without prior crosslinking as will be shown by examples hereinafter.

The medium density ethylene-butene-1 copolymer of the instant invention is similar in physical properties and uses to medium density polyethylenes of the prior art. As compared to high density polyethylenes the medium density ethylene-butene-1 copolymer of the instant invention has the advantage that in the biaxially orientation of film formed from this material, the clarity is far superior to high density polyethylene and the orientation temperature range is commercially feasible. As compared to low density polyethylene, the advantage is that the biaxial orientation can be preformed over a wide commercially acceptable range of temperatures without prior crosslinking. This advantage is also true of the instant material over other known medium density copolymers of ethylene-butene-1, as will be shown hereinafter.

Blends operable in the instant invention include blends of high, low and medium density polyethylene. For example, it is possible to homogeneously blend 20–40% high density polyethylene (0.95–0.96 g./cc.) with 80–60% medium density polyethylene (0.935–0.945 g./cc.) and obtain a blend which can be biaxially oriented over a blowing range of 112–124° C. without prior crosslinking or other treatment. Additionally, it is possible to blend high, medium and low density polyethylene, e.g. 20–40% high density polyethylene, 30–50% medium density polyethylene and the balance low density polyethylene (0.915–0.92 g./cc.) and obtain a blend which can be biaxially oriented over a temperature range of 98° C. to 125° C.

The following examples are set down to illustrate the invention and are not deemed to limit its scope. Throughout the instant invention tests were conducted as follows:

Melt Indices (MI) of the polymer material were measured under the conditions specified in ASTMD 1328–57T.

Densities of the polymer material were measured under the conditions specified in ASTMD 1505–57T.

The crystalline melting point of the polymer material was measured as the temperature at which birefrigence disappears from the sample when viewed through crossed Nicol prisms in a hot stage microscope heated at a rate of less than 1° C./min.

Unless otherwise noted all parts and percentages are by weight.

PREPARATION OF CATALYST

Example 1

The chromium oxide catalyst supported on a silica-alumina base is a well known polyethylene catalyst per se and is used commercially in the United States in the synthesis of 0.96 density polyethylene. It is prepared commercially by the process described in U.S. Patent 2,825,721 issued to Phillips Petroleum Co. It generally contains 1–2.5% Cr as $CrO_3$ supported on silica-alumina. The silica:alumina weight ratio is in the range 85–95:15–5. If desired the chromia may be formed in situ on the silica-alumina by in situ pyrolysis of a chromic salt, e.g. chromic nitrate. In the instant application 0.05–3% by weight of the supported chromium oxide catalyst of ammonium silicofluoride $(NH_4)_2SiF_6$, is admixed with the supported chromium oxide catalyst prior to activation. The admixed catalyst components are then subjected to fluidizing in hot air at a temperature in the range 100–1400° F. for periods of from 5 to 15 hours to activate the catalyst. It is also possible during the activation to add steam in an amount wherein the steam content of the steam-air mixture ranges from about 3 to 10% by volume. After cooling, the activated catalyst components are then ready for admixture with aluminum trialkyl for use in polymerizing the copolymer of the instant invention. The silica-alumina base used as the hexavalent chromia support is a well known activated silica-alumina petroleum cracking catalyst. Several processes for making it has been known for years to those skilled in the art.

COPOLYMER POLYMERIZATION PROCESS

Example 2

A one liter stainless steel autoclave equipped with stirrer, thermowell, ruptured disc, a ball valve serving as catalyst inlet, and an inlet for charging solvents and gases was flushed with nitrogen and then charged with .055 g. Cr as chromium oxide and 0.10 g. ammonium silicofluoride on a 90 weight percent silica-10 weight percent alumina support which had previously been activated by fluidization in air for about 7 hours at 1050° F. 360 ml. of cyclohexane were then charged to the autoclave under a nitrogen blanket followed by the addition of 6 cc. of a 0.1 molar solution of triisobutyl aluminum (0.12 g. triisobutyl aluminum) in cyclohexane. Stirring was commenced and the autoclave was heated to 280–290° F. The ethylene-butene-1 monomer feed (18.7 weight percent butene-1) was pressured into the autoclave under 250 p.s.i.g. Stirring was commenced and the reaction temperature was maintained at 280–290° F. and the pressure at about 370 p.s.i.g. by repressurizing with monomer feed during the 2 hour polymerization reaction. Thereafter the autoclave was cooled and vented and the solid copolymer product was removed from the autoclave. On characterization the copolymer product contained 3.5% butene, and had a density of 0.937 and a melt index of 0.49.

Samples of the copolymer were pressed into film form (15 mil thickness) at temperatures above their melting point, i.e. 125° C., on a platen press under 20,000 lbs. pressure. The film samples were then biaxially oriented under 2 to 5 lbs. air pressure at temperatures of 105, 110, 115, 120 and 125° C. In all cases a 4× maximum elongation in both directions was obtained resulting in a film thickness of 1.3 mils. The resulting biaxially oriented films had excellent clarity.

BIAXIAL ORIENTATION EXAMPLES

Example 3

A continuous run was made in a stainless steel autoclave provided with both internal and external oil-carrying heating coils, stirrer, monomer inlet feed line, solvent inlet line, solvent heater and product overflow line going to filters and solvent flash tank. Incoming monomer feed containing 28 weight percent butene-1 with the balance ethylene with sufficient cyclohexane solvent to maintain a reactor solids content between 8 and 12% and a catalyst consisting essentially of chromium oxide on silica-alumina, ammonium silicofluoride both of which were activated by fluidization at 1150° F. in air for about 10 hours was charged to the autoclave. Sufficient triisobutyl aluminum was added to the autoclave so that the ammonium silicofluoride:Cr in the $CrO_3$:Al in the triisobutyl aluminum mole ratio was maintained at 0.5:1.0:7.0. The triisobutyl aluminum was added under nitrogen pressure to the solvent line which solvent was heated to typically 220° F. before entering the autoclave. The incoming ingredients were regulated to provide a residence time in the autoclave of about 1–3 hours, preferably about 1.5 hours. During the reaction the temperature was maintained at 282° F. and the reactor pressures was 255 p.s.i.g. The pressure in the reactor was maintained by adding additional monomer feed as required to maintain the pressure. The product slurry was passed to filters wherein the solid polymer was separated from the solvent. The design of this continuous unit is conventional and is well known to those skilled in the art. The resulting copolymer had a density of 0.923, a melt index of 3.3 and contained 8.67% butene by weight.

The ethylene-butene-1 copolymer in pellet form was charged to a 1″ National Rubber Machinery extruder with a length:diameter ratio of 20:1 equipped with a bracer plate and packing screen. A 90° goose necked tubing die with 1½″ mantel and a 40 mil bushing was used to extrude the copolymer in the form of a 1⅛″ lay flat tube at a temperature in the rang 149–176° C. The extruder screw was run at 38 r.p.m. under 1000 p.s.i. to extrude tubing at the rate of 4–5 ft. per minute. The thus extruded tubing had a mil thickness in the range 17–19 mils.

The extruded tubing was passed through a furnace at 80° C. and thereafter biaxially oriented between temperature controlled nip rolls by the blown tube technique using sufficient air to yield a 4× biaxially elongated tube. The tubing was passed through the first pair of nip rolls at a speed of 3–3½ ft. per minute. The first pair of nip rolls were maintained at a temperature of 116° C. and the second set of nip rolls were maintained at room temperature and a speed of 14–15 ft./minute. The tube was expanded so that the final product had a mil thickness in the range 0.3–0.75 mil from its original mil thickness of 17–19 mils. The thus blown film was collected on a take-up roll which was being driven at a speed of 14–15 ft./minute.

Example 4

Continuous runs were performed with other ethylene-butene-1 copolymers containing varying amounts of butene using the procedure of Example 3. Using the blown tube technique and 5 pounds air pressure in the bubble, it has been found that the orientation temperature range can vary between the commercially acceptable units shown in Table I. (At lower pressures, the temperature range will be broader, but the elongation will be lower.) For commercial operation the blowing pressures are of the order of 4–5 p.s.i.

TABLE I

| Weight percent butene-1 in ethylene-butene-1 copolymer | Copolymer density, g./cc. | Biaxial orientation temperature range at 5 p.s.i.g. (° C.) |
|---|---|---|
| 2.0 | 0.945 | 111–116 |
| 3.5 | 0.937 | 108–116 |
| 6.0 | 0.929 | 103–117 |
| 8.6 | 0.925 | 100–116 |
| 10.0 | 0.920 | 97–105 |

The following examples show the inoperability of other ethylene-butene-1 copolymers polymerized with other catalyst systems and the inoperability of ethylene homopolymer polymerized with the instant catalyst system to be biaxially oriented over a wide temperature without prior crosslinking.

Example 5

A commercially available ethylene-butene-1 copolymer containing 4.2 weight percent butene-1 was pressed on a platen press at 40° C. to obtain a film of 15 mil thickness. The thus formed film was then biaxially oriented under 5 lbs. air pressure at various temperatures ranging from 105, 110, 115, 120, and 125° C. The blowing range was 110–112° C., too narrow for a commercial process. At this pressure, the film burst below 110° C. and above 112° C.

Example 6

Commercially available low density polyethylene sold under the tradename "Alathon-14" having a density of 0.923 and a melting point of 106° C. and a melt index of 2.0 was pressed in a platen press into film form (15 mil thickness) at 140° C. and 25,000 lbs. pressure. Attempts were made to biaxially orient the thus formed film under 5 lbs. air pressure at 5° C. intervals temperature from 95–130° C. The film in all cases burst on application of air pressure.

Example 7

Using the procedure and catalyst system of Example 2, except that solely ethylene was in the monomer feed and butene-1 was withheld therefrom, an ethylene homopolymer was formed. On characterization the ethylene homopolymer had a density of 0.945, and a melting point of 132° C. The thus formed ethylene polymer was pressed into film form (15 mil thickness). Attempts were made to biaxially orient the film at 1° C. intervals over a range of 115–130° C. and 5 lbs. air pressure. It was found that the film burst on application of air pressure in all cases except in the temperature range 121–124° C. This range is not sufficiently broad for commercial practice.

In addition, the film had poorer clarity than the copolymers.

Example 8

Commercially available polyethylene having a density of 0.950, a melting point of 128° C. and a melt index of 5.0 was pressed in a platen press into film form (15 mil thickness) at 150° C. and 25,000 lbs. Attempts were made to biaxially orient the film at 1° C. intervals over a range of 115–130° C. at 5 lbs. air pressure. The film could be oriented only over a temperature range of 122–125° C., too narrow a temperature range for commercial practice.

Example 9

A blend of 30% by weight of polyethylene having a density of 0.955 and 70% polyethylene having a density of 0.94 was charged to a Brabender Plastograph and milled therein at a temperature of 150° C. for 5 minutes. The homogeneous blended sample was removed from the Brabender and pressed into film form (15 mil thickness) at a temperature of 150° C. on a platen press under 20,000 lbs. pressure. The film samples were then biaxially oriented under 2 to 5 lbs. air pressure at temperatures of 112, 115, 118, 121 and 124° C. In all cases, a 4× maximum elongation in both directions was obtained resulting in a film thickness of 1.25 mils. The resulting biaxially oriented films had excellent clarity.

Example 10

Example 9 was repeated except that the blend consisted of 20% polyethylene having a density of 0.96, 40% polyethylene having a density of 0.940 and 40% polyethylene having a density of 0.915. After blending the polymer on a Brabender at 150° C. for 3 minutes the blended sample was removed and pressed into film form (15 mil thickness). The film samples were then biaxially oriented under 2 to 5 lbs. air pressure at temperatures of 98° C., 108° C., 115° C. and 125 °C. In all cases, a 4× maximum elongation in both directions was obtained resulting in a film thickness of 1.3 mils. The resulting biaxially oriented film had good clarity.

The data shown in the figure was measured on a polarizing microscope equipped with a phototube and recorder in such a way that the light intensity measurements were proportional to the amount of crystallinity. The cooling rate employed to obtain curves was constant at an average rate of 8° C. per minute. The curves in the figure show the percent crystallinity as a function of temperature on cooling for commercially available low and high density polyethylene and ethylene-butane butene copolymers. It is to be noted that neither the high (see Example 8) nor the low density (see Example 6) polyethylene samples were biaxially orientable over a commercially operable temperature range. In the case of the high density sample the rate of increase in crystallinity is greater than 10%/° C. above 40% crystallinity. In the case of the low density sample biaxial orientation was not feasable because the rate of increase in crystallinity was less than 10%/° C. in the range 20–40% crystallinity. In all cases of the ethylene-butene copolymers, see Table I in Example 4, the copolymers were biaxially orientable over a very wide temperature range due to the fact that their rate of increase in crystallinity was greater than 10%/° C. in the range of 20–40% crystallinity and thereafter the rate of increase in crystallinity was less than 10%/° C.

In practicing the instant invention, the copolymerization of alpha olefins is preferably carried out in the presence of a suitable hydrocarbon solvent. Examples of hydrocarbon solvents include but are not limted to, cyclohexane, pentene, hexene, heptene, octane, benzene, xylene, toluene, and the like.

The amount of polymerization catalyst is not critical: 0.2 to 2 g. catalyst per 100 g. of copolymer polymerized is suitable, but amounts considerably larger or smaller are operable, typically 0.1 to 10 g. of catalyst per 100 g. of copolymer are employed.

The alpha olefin blends and copolymers of the instant invention can be used as heat shrinkable film after orientation.

What is claimed is:

1. A composition capable of being biaxially oriented by the blown tube technique over a temperature range 98–125° C. without prior crosslinking consisting an ethylene-butene-1 copolymer having a density in the range 0.920–0.945 and containing 2–10% butene-1 by weight, said copolymer being prepared by the polymerization of ethylene and butene-1 in the presence of a catalyst consisting essentially of an aluminum trialkyl wherein the alkyl groups contain 1 to 8 carbon atoms and a mixture of ammonium silicofluoride and chromium oxide on a silica-alumina support said mixture being activated in air at a temperature of 1000–1400° F., the mole ratio of the ammonium silicofluoride:Cr:Al in the catalyst being in the range 0.3 to 0.75:1.0:0.1 to 15.0 respectively and the weight ratio of silica to alumina in the support being 85 to 95: 15 to 5 respectively, said copolymer having the characteristic that at its crystallization temperature it crystallizes uniformly at a rate of increase in crystallinity with decreasing temperature of greater than 10%/° C. in the range 20–40% crystallinity and at rate of increase in crystallinity with decreasing temperature of less than 10%/° C. thereafter.

References Cited

UNITED STATES PATENTS

| 3,372,049 | 3/1968 | Schaffhausen | 117—7 |
| 3,125,548 | 3/1964 | Anderson | 260—45.5 |
| 3,083,410 | 4/1963 | McGlamery | 18—48 |
| 2,983,704 | 5/1961 | Roedel | 260—45.5 |

FOREIGN PATENTS 937,807 9/1963 Great Britain.

SAMUEL H. BLECH, Primary Examiner

C. J. SECCURO, Assistant Examiner

U.S. Cl. X.R.

252—429, 441; 260—897; 264—289, 290